(12) United States Patent
Lauter et al.

(10) Patent No.: US 7,627,760 B2
(45) Date of Patent: Dec. 1, 2009

(54) EXTENDED AUTHENTICATED KEY EXCHANGE

(75) Inventors: Kristin E. Lauter, La Jolla, CA (US); Anton Mityagin, La Jolla, CA (US)

(73) Assignee: Microsoft Corporation, Redmond, WA (US)

( * ) Notice: Subject to any disclaimer, the term of this patent is extended or adjusted under 35 U.S.C. 154(b) by 809 days.

(21) Appl. No.: 11/186,251

(22) Filed: Jul. 21, 2005

(65) Prior Publication Data

US 2007/0033403 A1 Feb. 8, 2007

(51) Int. Cl.
*H04L 9/00* (2006.01)
*H04L 9/32* (2006.01)

(52) U.S. Cl. .......................... 713/171; 380/44
(58) Field of Classification Search .................. 713/171; 380/44

See application file for complete search history.

(56) References Cited

U.S. PATENT DOCUMENTS

| 6,122,736 | A | 9/2000 | Vanstone et al. |
|---|---|---|---|
| 6,226,383 | B1 | 5/2001 | Jablon |
| 6,487,661 | B2 | 11/2002 | Vanstone et al. |
| 6,539,479 | B1 | 3/2003 | Wu |
| 6,718,467 | B1 | 4/2004 | Trostle |
| 6,993,651 | B2 | 1/2006 | Wray et al. |
| 7,490,239 | B2 | 2/2009 | Beeson |
| 2002/0062451 | A1 | 5/2002 | Scheidt et al. |
| 2003/0081785 | A1 | 5/2003 | Boneh et al. |
| 2003/0123655 | A1 | 7/2003 | Lambert et al. |
| 2004/0081321 | A1 | 4/2004 | Struik |
| 2006/0093138 | A1* | 5/2006 | Durand et al. ................. 380/44 |

OTHER PUBLICATIONS

SeongHan Shin, "Leakage-Resilient Authenticated Key Establishment Protocols", LNCS 2894, Advances in Cryptology—ASIACRYPT, pp. 155-173, Springer Berlin/Heidelberg, 2003.*
Boyd et. al., "Elliptic Curve Based Password Authenticated Key Exchange Protocols", ACISP 2001, LNCS 2119, pp. 487-501, 2001, Springer-Verlag Berlin Heidelberg 2001.*
Scott Vanstone, PCT/CA 03/00317, "Key Argument and Transport Protocol", Mar. 8, 2002.*
Canetti et al., "Analysis of Key-Exchange Protocols and Their Use for Building Secure Channels", LNCS, vol. 2045, Proceedings of the International Conference on the Theory and Application of Cryptographic Techniques: Advances in Cryptography. pp. 451-474. Springer-Verlag. 2001.*
Law et al. "An Efficient Protocol for Authenticated Key Agreement"; Technical Report CORR 98-05, Dept. of C&O, University Waterloo, Canada, 1998; pp. 1-16.

* cited by examiner

*Primary Examiner*—Carl Colin
*Assistant Examiner*—Hee Song
(74) *Attorney, Agent, or Firm*—Lee & Hayes, PLLC (57) ABSTRACT

Extended authenticated key exchange is described. In one aspect, an identity ($ID_A$) of an initiator and an identity ($ID_B$) of a responder are determined. A first party (i.e., the initiator or the responder) computes a session key based at least on $ID_A$ and $ID_B$. A second party (i.e., the initiator or the responder) that is not the first party, uses at least $ID_A$ and $ID_B$ to compute a corresponding session key. The initiator's session key and the responder's corresponding session key, if equal, provide for secure exchange of data between the initiator and the responder.

20 Claims, 3 Drawing Sheets

EXTENDED AUTHENTICATED KEY EXCHANGE

BACKGROUND

Many standards documents governing the use of public key cryptography include specifications for Authenticated Key Exchange (AKE). AKE protocols involve two parties, an initiator and a responder. The goal of AKE is to allow the two parties to generate a secret session key, while authenticating the identities of the parties, so that the two parties can securely exchange information over a public channel with one another. AKE protocols such as Menezes-Qu-Vanstone (MQV) and an elliptic curve (EC) analogue (ECMQV) have recently been introduced. MQV and ECMQV are based on the well-known Diffie-Hellman key exchange protocol. The Diffie-Hellman key exchange protocol relies on the hardness of computing the discrete logarithm in a mathematical group. That is, if one takes an arbitrary number g known to everyone, picks an exponent, raises g to the power of this exponent, and announces the result, it becomes computationally infeasible for someone to determine which exponent was used.

Recent research has shown that the KEA, MQV, and ECMQV protocols are not secure against certain classes of attacks such as impersonation attacks.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Extended authenticated key exchange is described. In one aspect, an identity ($ID_A$) of an initiator and an identity ($ID_B$) of a responder are determined. A first party (i.e., the initiator or the responder) computes a session key based at least on $ID_A$ and $ID_B$. A second party (i.e., the initiator or the responder) that is not the first party, uses at least $ID_A$ and $ID_B$ to compute a corresponding session key. The initiator's session key and the responder's corresponding session key, if equal, provide for secure exchange of data between the initiator and the responder over a public network.

BRIEF DESCRIPTION OF THE DRAWINGS

In the Figures, the left-most digit of a component reference number identifies the particular Figure in which the component first appears.

DETAILED DESCRIPTION

Overview

Extended authenticated key exchange protocols KEA+ and EC-KEA+ provide extensions to existing Diffie-Hellman based AKE protocols. More particularly, KEA+ provides for extended authenticated key exchange using a multiplicative group of a prime field, and EC-KEA+ provides for extended authenticated key exchange using a group of points on an elliptic curve of prime order. KEA+ and EC-KEA+ are different from conventional AKE protocols in that KEA+ and EC-KEA+ generate secret session key values based on the identities of the parties that are exchanging the information. In one implementation, KEA+ and EC-KEA+ also utilize a session identifier to generate secret session key values. To these ends, KEA+ and EC-KEA+ implement two (2) rounds of communication between the initiator and the responder to achieve provable security against impersonation. KEA+ and EC-KEA+ achieve a higher level of security than simply combining the standard Diffie-Hellman key exchange protocol with the standard digital signature protocol/algorithm (DSA). KEA+ and EC-KEA+ operations provide provable security that is resistant to classes of attacks such as impersonation attacks, to which the standard AKE protocols are not resistant.

The following sections describe these and other aspects of extended authenticated key exchange protocols (KEA+ and EC-KEA+) in greater-detail.

An Exemplary System

Although not required, extended authenticated key exchange is described in the general context of computer-program instructions being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
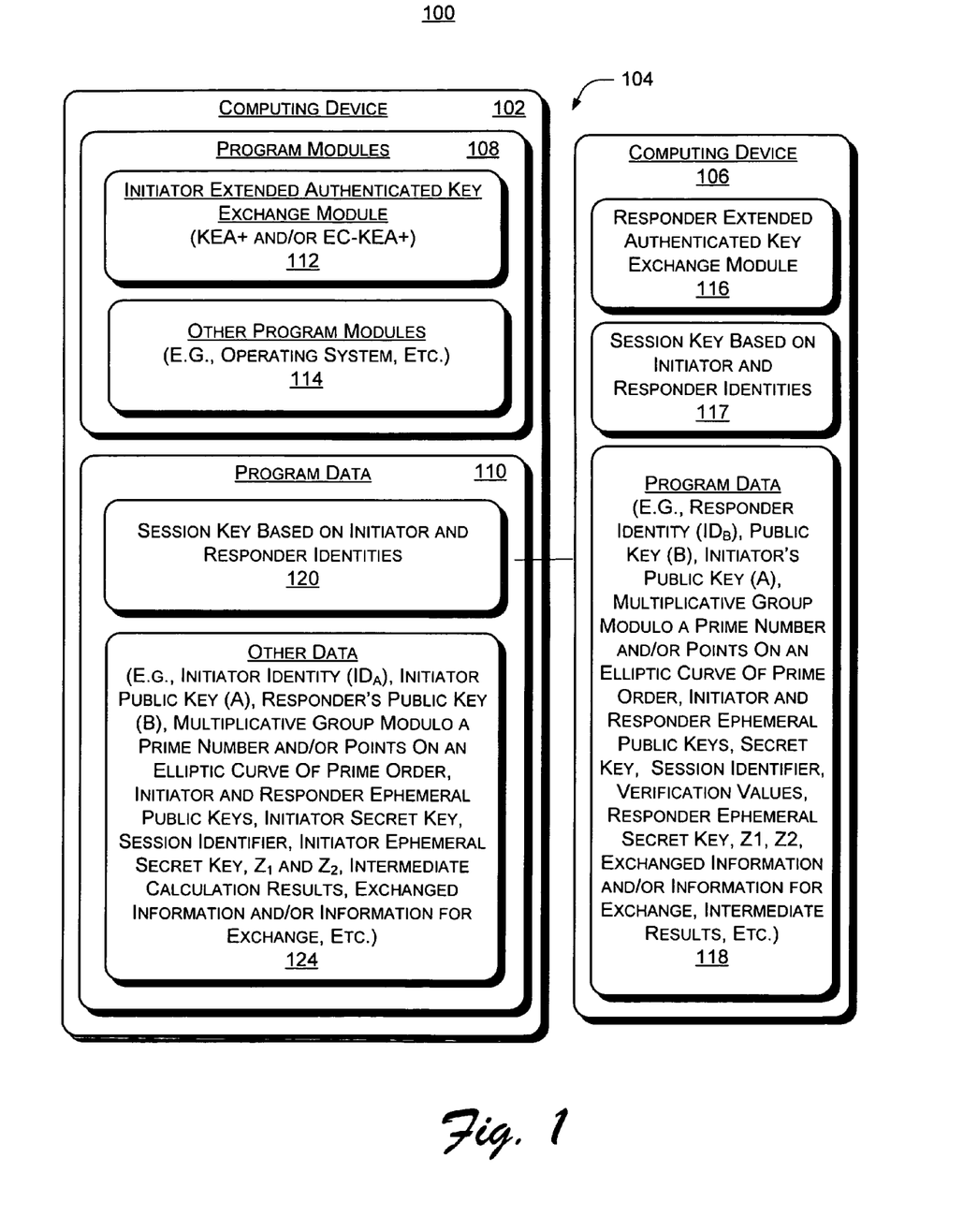
FIG. 1 shows an exemplary system for extended authenticated key exchange.

FIG. 1 shows an exemplary system 100 for extended authenticated key exchange. In this implementation, system 100 includes a general purpose computing device 102 coupled over network 104 to another general-purpose computing device 106. Computing devices 102 and 106 represent any type of computing device such as a personal computer, a laptop, a server, handheld or mobile computing device (e.g., a cellular phone, personal digital assistant), and/or so on. Computing device 102 includes program modules 108 and program data 110 to implement initiator operations of extended authenticated key exchange. For example, program modules 108 include, for example, initiator extended authenticated key exchange module 112 and other program modules 114 such as an operating system, etc. Computing device 106 also includes program modules and program data to implement responder operations of extended authenticated key exchange. For example, computing device 106 includes responder extended authenticated key exchange module 116, a session key 117 that is based on initiator and responder identities, and other data 118.

Both initiator and responder extended authenticated key exchange modules 112 and 116 respectively implement KEA+ and/or EC-KEA+ operations. KEA+ operations are directed to extended authenticated key exchange using a group of natural numbers modulo a fixed prime number to allow the two parties (i.e., an initiator and a responder) to determine an agreed secret session key that is based on initiator and responder identities, while authenticating identities of the parties. EC-KEA+ extended authenticated key exchange is executed in a group of points on an elliptic curve of prime order to determine an agreed secret session key based on initiator and responder identities, while authenticating identities of the parties. In both instances (i.e., KEA+ and EC-KEA+), the respectively determined session keys 120 and 117 allow the initiator and responder to securely exchange information with one another over network 104 (e.g. a public channel). Session key 120 represents a session key determined by the initiator, and session key 117 represents a session key determined by the responder (and these keys are supposed to be equal if the protocol is properly executed). KEA+ and EC-KEA+ protocols assume that the two parties have respective identities (initiator and responder identities) and public keys registered with a certificate of authority. Techniques to register identities and public keys with a certificate authority are well known. For purposes of exemplary illustration, initiator and responder identities ($ID_A$ and $ID_B$), as well as initiator and responder public keys (A and B), are shown as respective portions of data 124 and 118.

We now describe exemplary KEA+ operations with respect to TABLE 1. (Exemplary EC-KEA+ operations are described in greater detail below with respect to TABLE 2).

KEA+

TABLE 1

EXEMPLARY OPERATIONS FOR KEA+

| Initiator (e.g., computer 102) | Responder (e.g., computer 106) |
|---|---|
| Identity: $ID_A$ | Identity: $ID_B$ |
| Secret key: a from [1 ... q−1] | Secret key: b from [1 ... q−1] |
| Public key: $A = g^a \mod p$ | Public key: $B = g^b \mod p$ |
| Responder's public key: B | Initiator's public key: A |
| Session identifier: sid | Session identifier: sid |
| Assumption: Responder's public key is valid | Assumption: Initiator's public key is valid |
| Pick x at random from [1 ... q−1] | Receive X from Initiator |
| Compute $X = g^x \mod p$ | Verify that $X^q = 1 \mod p$; if "not", terminate |
| Send X to the Responder | |
| Receive Y from the Responder | Pick y at random from [1 ... q−1] |
| Verify that $Y^q = 1 \mod p$; if "not", terminate | Compute $Y = g^y \mod p$ |
| | Send Y to Initiator |
| Compute $Z_1 = Y^a \mod p$ | Compute $Z_1 = A^y \mod p$ |
| Compute $Z_2 = B^x \mod p$ | Compute $Z_2 = X^b \mod p$ |
| Compute a session key $K = H(Z_1, Z_2, ID_A, ID_B, sid)$ | Compute a session key $K = H(Z_1, Z_2, ID_A, ID_B, sid)$ |

Referring to TABLE 1, the first column represents initiator operations/properties that are associated with computer 102 ("the initiator 102"), and the second column represents responder operations/properties associated with computer 106 ("the responder 106"). The setup parameters for KEA+ are as follows. The value p is a fixed prime number. The parameter q is a fixed prime number that is a divisor of p−1. The value g is an element from [1 ... p−1], which has order q; the powers of g can be viewed as a subgroup of order q of the multiplicative group [1 ... p−1], H is an arbitrary standard cryptographic hash function used to map all possible binary strings to binary strings of a fixed length. Identities $ID_A$ and $ID_B$ are arbitrary binary strings comprising, for example, the names of the respective parties, addresses, and/or any other type of context information. Each of these setup parameters is represented by respective portions of other data 124. Techniques to obtain and/or generate these setup parameters are well known.

As shown in TABLE 1, the initiator 102 utilizes secret key a; the responder 106 utilizes secret key b. Each of the initiator and the responder maintains a respective public key that has been registered with a certificate authority (not shown). For example, the initiator 102 uses public key $A=g^a$, and the responder 106 uses public key $B=g^b$. At this point, it is assumed that the initiator's and responder's public keys are valid, meaning that they are elements from [1, ... p−1] which are of order q. This validity property can be checked by raising a public key to the power q to determine if the output is 1 modulo p. Each communicating party knows the other respective party's public key. That is, the initiator 102 has the responder's public key, and the responder 106 has the initiator's public key.

The session identifier sid should be different for each respective session between the initiator 102 and the responder 106. The value of the session identifier is arbitrary, being a function of the particular implementation utilized to generate the session identifier.

KEA+ begins with the generation and exchange between the initiator 102 and responder 106 of respective ephemeral public keys X and Y. Initiator and responder ephemeral public keys are shown by respective portions of data 124 and 118. To generate the initiator ephemeral public key X, the initiator 102 randomly selects an exponent x, the initiator's ephemeral secret key, from [1 ... q−1]. The initiator 102 then computes the ephemeral public key X by raising the generator of the group g to the power x modulo p. The initiator 102 sends the ephemeral public key X to the responder 106.

Responsive to receiving the initiator's ephemeral public key X, the responder 106 verifies that X is valid by raising X to the power of q to determine whether the result is the identity element of the group, which is 1 modulo p. If this validity check fails, the responder 106 terminates the KEA+ protocol. If the initiator ephemeral public key X is determined to be valid, the responder 106 calculates an ephemeral public key Y by determining a secret ephemeral key y, and computing the corresponding public ephemeral key Y. For purposes of exemplary illustration, a respective portion of program data 118 represents the responder secret ephemeral key y. The responder 106 sends the ephemeral public key Y to the initiator.

Responsive to receiving the responder's ephemeral public key Y, the initiator 102 verifies the validity of the responder's ephemeral public key. The initiator 102 accomplishes this by raising Y to the power of q to determine whether the result is the identity element of the group, which is 1 modulo p. If this validity check fails, the initiator 102 terminates the KEA+ protocol.

At this point, assuming that the ephemeral public keys X and Y have been validated, each respective party computes a respective session key (e.g., session keys 120 and 117) based on its own secret information and information known about the other party. Such information includes the exchanged ephemeral public keys X and Y and the respective identities of the parties (i.e., $ID_A$ and $ID_B$). For instance, the initiator 102 raises the ephemeral public key received from the responder (Y) to the power a, which is the secret key associated with the initiator 102, to obtain a number $Z_1$ from the group. Next, the initiator 102 computes another number from the group, $Z_2$, by raising the public key of the responder (B) to the power of x, which is the ephemeral secret key of the initiator 102. The initiator 102 computes a session key K (e.g., session key 120) by hashing the concatenation of the following five values: $Z_1$, $Z_2$, $ID_A$, $ID_B$, and sid. In one implementation, the session key is determined by hashing only a subset of the above-indicated five values, for example only $Z_1$, $Z_2$, $ID_A$, $ID_B$. This is in contrast to conventional AKE protocols, which generate a session secret key as a hash of only $Z_1+Z_2$ (here, "+" stands for the XOR operation).

The responder 106 computes a session key K (i.e., session key 117) by raising the public key of the initiator (A) to the randomly selected number y from [1 ... q−1] to obtain a number $Z_1$ in the group. The responder 106 computes another number in the group, $Z_2$, by raising the initiator's ephemeral public key X to the power of b, which is the secret key maintained by the responder 106. The responder 106 computes the session key K by hashing a concatenation of the five values values $Z_1$, $Z_2$, $ID_A$, $ID_B$, and sid. In one implementation, the session key is determined by hashing only a subset of the above-indicated five values, for example only $Z_1$, $Z_2$, $ID_A$, $ID_B$.

Using the session keys 120 and 117 (which are supposed to be equal), the initiator 102 and the responder 106 can securely exchange information. For purposes of exemplary illustration, respective portions of data 124 and 118 represent securely exchanged information and/or information for secure exchange.

EC-KEA+

We now describe exemplary operations for EC-KEA+, which is elliptic curve based extended authenticated key exchange protocol, in reference to TABLE 2.

TABLE 2

EXEMPLARY OPERATIONS FOR EC-KEA+

| Initiator | Responder |
|---|---|
| Identity: $ID_A$ | Identity: $ID_B$ |
| Secret key: a from [1 . . . q−1] | Secret key: b from [1 . . . q−1] |
| Public key: A = aP | Public key: B = bP |
| Responder's public key: B | Initiator's public key: A |
| Session identifier: sid | Session identifier: sid |
| Assumption: Responder's public key is valid | Assumption: Initiator's public key is valid |
| Pick x at random from [1 . . . q−1] | Receive X from Initiator |
| Compute X = xP | Verify that X is in G; if "not", terminate |
| Send X to the Responder | |
| Receive Y from the Responder | Pick y at random from [1 . . . q−1] |
| Verify that Y is in G; if "not", terminate | Compute Y = yP |
| | Send Y to Initiator |
| Compute $Z_1$ = aY | Compute $Z_1$ = yA |
| Compute $Z_2$ = xB | Compute $Z_2$ = bX |
| Compute a session key K = H($Z_1$, $Z_2$, $ID_A$, $ID_B$, sid) | Compute a session key K = H($Z_1$, $Z_2$, $ID_A$, $ID_B$, sid) |

Referring to TABLE 2, the first column represents initiation operations/properties associated with computer 102 (i.e., "initiator 102"), and the second column represents responder operations/properties associated with computer 106 (i.e., responder 106). The setup parameters for EC-KEA+, which is elliptic curve based extended authenticated key exchange protocol, are as follows. G is a group of points Oil an elliptic curve E of prime order. The elliptic curve is specified by an equation i x3+ax+b. The group of points on the elliptic curve consists of ordered pairs (x, y) that satisfy this elliptic curve equation, and the identity, a point at infinity. EC-KEA+ implements scalar multiplication in an elliptic curve group (i.e., the group operation is addition of points), rather than exponentiation operations such as those described above with respect to the KEA+ protocol. The value q is a prime number, which represents the order, or size, of the group G. The value P is an element from G, which has order q, and H is an arbitrary cryptographic hash function. For purposes of exemplary illustration, respective portions of data 124 and 118 represent these EC-KEA+ setup parameters. Techniques to obtain and/or generate such setup parameters are well known.

As shown in TABLE 2, each party (the initiator and the responder) has its own long-term secret key (a or b), which is an exponent from [1 . . . q−1], wherein q is the size of the group G. For example, the initiator has secret key a, and the responder has secret key b. Each party has its own public key (respectively, A or B) registered with a certificate authority. The initiator 102 uses public key A, and the responder 106 uses public key B. At this point, the operations of EC-KEA+ assume that the public keys are valid, meaning that they are valid points on the specified elliptic curve. Additionally, each party has access to (i.e. knows) the other respective party's public key. That is, the initiator 102 has the responder's public key, and the responder 106 has the initiator's public key.

The session identifier sid should be different for each respective session between the initiator 102 and the responder 106. The value of the session identifier is arbitrary, being a function of the particular implementation utilized to generate the session identifier.

EC-KEA+ begins with the generation and exchange between the initiator 102 and responder 106 of respective ephemeral public keys X and Y. More particularly, the initiator 102 begins the KEA+ protocol by randomly selecting a scalar multiple x, the initiator's ephemeral secret key, from [1 . . . q−1]. The initiator 102 then computes an ephemeral public key X by adding P to itself x times. The initiator 102 sends the ephemeral public key X to the responder 106.

Responsive to receiving the initiator's ephemeral public key X, the responder 106 verifies that X is valid by verifying that X is in G. If this validity check fails, the responder 106 terminates the EC-KEA+ protocol. If the initiator's ephemeral public key is determined to be valid, the responder 106 picks a responder secret ephemeral key y at random and computes the corresponding responder ephemeral public key Y, as shown in TABLE 2. The responder 106 sends the responder's ephemeral public key Y to the initiator 102.

Responsive to receiving the responder's ephemeral public key Y, the initiator 102 verifies the validity of the responder's ephemeral public key by verifying that Y is in G. If this validity check fails, the initiator 102 terminates the EC-KEA+ protocol. If both the ephemeral public keys X and Y are valid, each respective party 102 and 106 computes a session key K (i.e., session keys 120 and 117) based on its own secret information and information known about the other party. Such information includes the exchanged ephemeral public keys X and Y, and the respective identities of the parties (i.e., $ID_A$ and $ID_B$). For instance, the initiator 102 adds the ephemeral public key received from the responder (Y) to itself a times to calculate a point $Z_1$. Next, the initiator 102 computes another point in G, $Z_2$, by adding the public key of the responder (B) to itself x times. The initiator 102 computes a session key K (e.g., session key 120) by hashing the concatenation of the following five values: $Z_1$, $Z_2$, $ID_A$, $ID_B$, and sid. In one implementation, the session key is determined by hashing only a subset of the above-indicated five values, for example only $Z_1$, $Z_2$, $ID_A$, $ID_B$.

The responder 106 computes the session key K (session key 117) by adding the public key of the initiator (A) to itself y times to obtain a point $Z_1$ in G. The responder 106 than computes another point in G, $Z_2$, by adding the initiator's ephemeral public key X to itself b times. The responder 106 computes the session key K by hashing a concatenation of the five values values $Z_1$, $Z_2$, $ID_A$, $ID_B$, and sid. In one implementation, the session key is determined by hashing only a subset of the above-indicated five values, for example only $Z_1$, $Z_2$, $ID_A$, $ID_B$.

Using the session keys 120 and 117 (which are supposed to be equal) determined with the above described EC-KEA+ operations, the initiator 102 in the responder 106 can securely exchange information. For purposes of exemplary illustration, respective portions of data 124 and 118 represent securely exchanged information and/or information for secure exchange.

Exemplary Procedure

Figure 2:
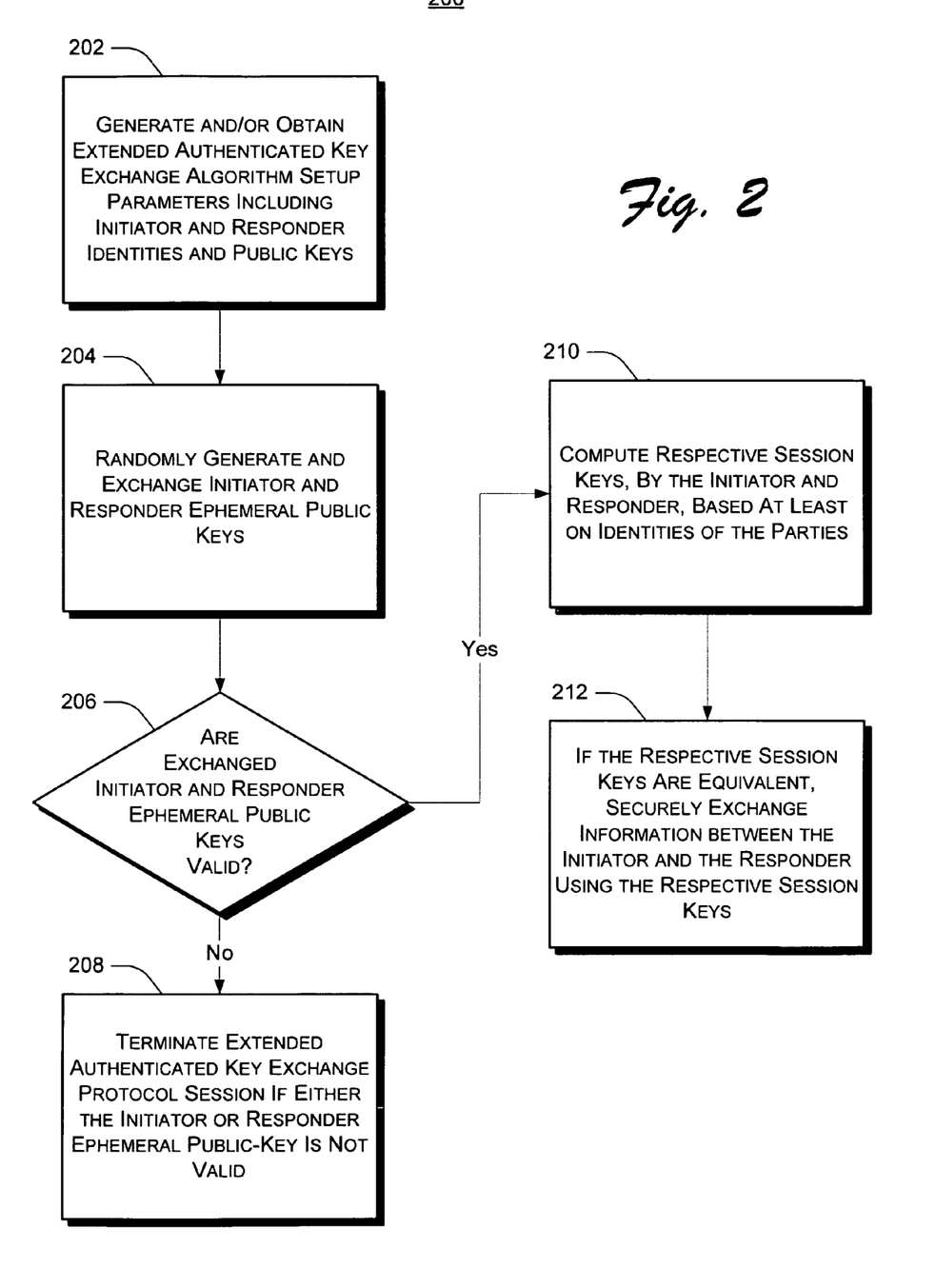
FIG. 2 shows an exemplary procedure for extended authenticated key exchange.

FIG. 2 shows an exemplary procedure 200 for extended authenticated key exchange. For purposes of discussion and exemplary illustration, operations of this procedure are described with respect to components of FIG. 1. The left-most digit of a component reference number identifies the particular figure in which the component first appears. At block 202, the extended authenticated key exchange program modules 112 and 116, which are respectively associated with an initiator and a responder, generate and/or obtain setup parameters to implement extended authenticated key exchange operations. The setup parameters associated with KEA+ operations are directed to extended authenticated key exchange using a group of natural numbers modulo a fixed prime number. The setup parameters associated with EC-KEA+ operations are directed to extended authenticated key exchange operations using a group of points on elliptic curve of prime order.

At block 204, program modules 112 and 116 respectively randomly generate and exchange initiator and responder ephemeral public keys X and Y. At block 206, program modules 112 and 116 respectively verify that the exchanged ephemeral public keys X and Y are valid. If either one of the exchanged ephemeral public keys is determined not to be valid, the extended authenticated key exchange protocol session is terminated at block 208. Otherwise, the operations of procedure 200 continue at block 210.

At block 210, program modules 112 and 116 compute respective session keys 120 and 117 based at least in part on identities (i.e., $ID_A$ and $ID_B$) associated with the initiator and the responder. In one implementation, the respective session keys are also based on a session identifier (sid). At block 212, if the respective session keys are equal, the initiator and the responder securely exchange information using the respective session keys 120 and 117.

An Exemplary Operating Environment

Figure 3:
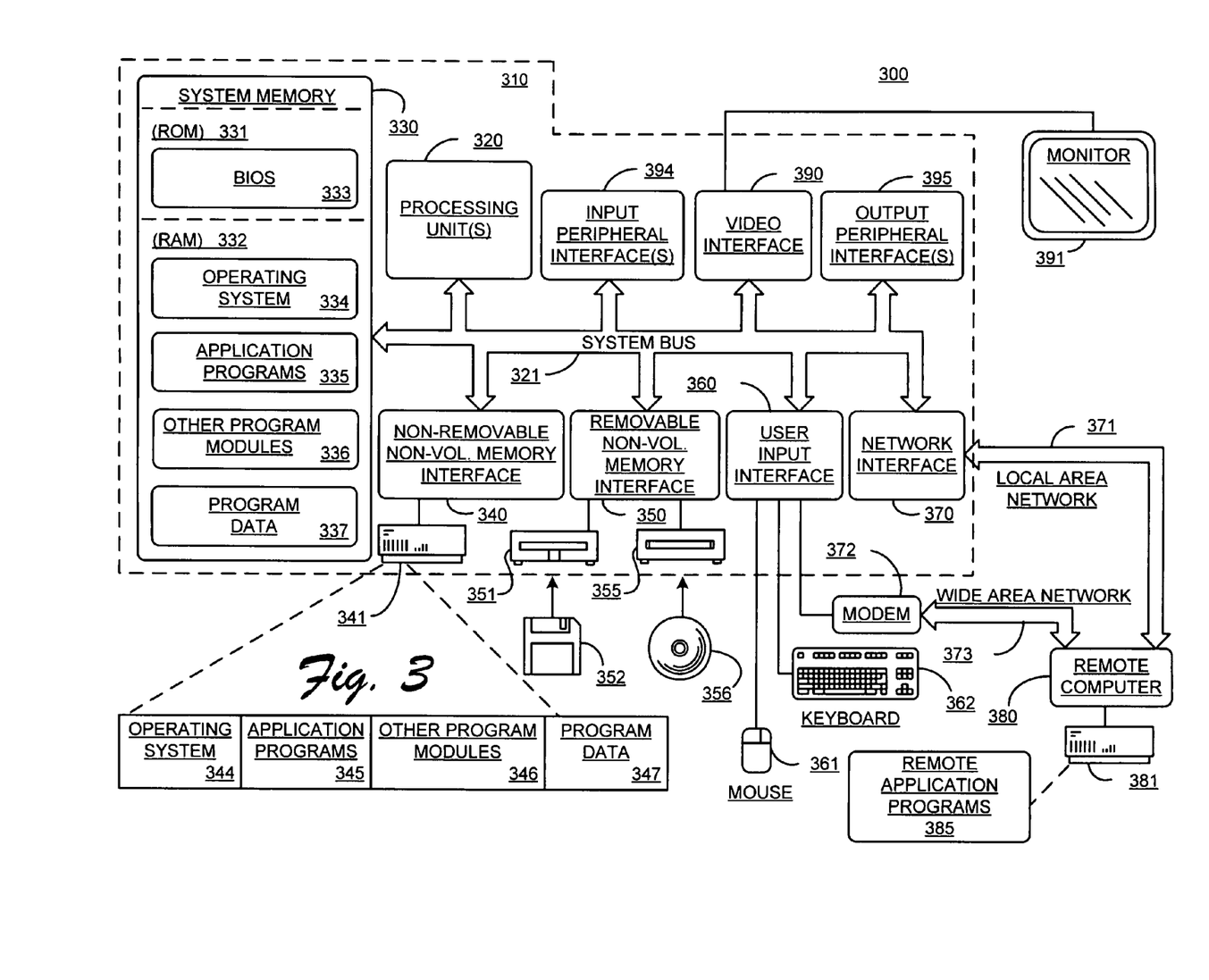
FIG. 3 illustrates an example of a suitable computing environment for implementing (fully or partially) extended authenticated key exchange.

FIG. 3 illustrates an example of a suitable computing environment in which extended authenticated key exchange may be fully or partially implemented. Exemplary computing environment 300 is only one example of a suitable computing environment for the exemplary system 100 of FIG. 1 and exemplary operations of FIG. 2, and is not intended to suggest any limitation as to the scope of use or functionality of systems and methods the described herein. Neither should computing environment 300 be interpreted as having any dependency or requirement relating to any one or combination of components illustrated in computing environment 300.

The methods and systems described herein are operational with numerous other general purpose or special purpose computing system, environments or configurations. Examples of well-known computing systems, environments, and/or configurations that may be suitable for use include, but are not limited to personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a networked computing environment where tasks are performed by remote processing devices that are linked through a communications network.

With reference to FIG. 3, an exemplary system providing extended authenticated key exchange includes a general-purpose computing device in the form of a computer 310 implementing, for example, initiator operations associated with computing device 102 of FIG. 1. Components of computer 310 may include, but are not limited to, processing unit(s) 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 310 typically includes a variety of computer-readable media. Computer-readable media can be any available media that can be accessed by computer 310, including both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that they are at least different copies.

A user may enter commands and information into the computer 310 through input devices such as a keyboard 362 and pointing device 361, commonly referred to as a mouse, trackball or touch pad. Other input devices (not shown) may include a microphone, joystick, graphics pen and pad, satellite dish, scanner, etc. These and other input devices are often connected to the processing unit 320 through a user input interface 360 that is coupled to the system bus 321, but may be connected by other interface and bus structures, such as a parallel port, game port or a universal serial bus (USB). In this implementation, a monitor 391 or other type of user interface device is also connected to the system bus 321 via an interface, for example, such as a video interface 390.

The computer 310 operates in a networked environment using logical connections to one or more remote computers, such as a remote computer 380. In one implementation, remote computer 380 represents computing device 106 of a responder, as shown in FIG. 1. The remote computer 380 may be a personal computer, a server, a router, a network PC, a peer device or other common network node, and as a function of its particular implementation, may include many or all of the elements described above relative to the computer 310, although only a memory storage device 381 has been illustrated in FIG. 3. The logical connections depicted in FIG. 3 include a local area network (LAN) 381 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example and not limitation, FIG. 3 illustrates remote application programs 385 as residing on memory device 381. The network connections shown are exemplary and other means of establishing a communications link between the computers may be used.

CONCLUSION

Although the above sections describe extended authenticated key exchange in language specific to structural features and/or methodological operations or actions, the implementations defined in the appended claims are not necessarily limited to the specific features or actions described. Rather, the specific features and operations of system 100 (FIG. 1) and procedure 200 (FIG. 2) are disclosed as exemplary forms of implementing the claimed subject matter.

The invention claimed is:

1. A computer-implemented method for extended authenticated key exchange using a mathematical group, via operations comprising:

initiating operations to execute extended authenticated key exchange between an initiator computing device and a responder computing device connected via a network;

generating setup parameters on a computing device, the setup parameters comprising:

a first fixed prime number, a second fixed prime number that is a divisor of the first fixed prime number minus 1, a key group from 1 to the second fixed prime number minus 1;

an element from the 1 to the first fixed prime number minus 1, which has order of the second fixed prime number, an initiator long-term secret key selected from the key group, an initiator public key, in the mathematical group based on the initiator long-term secret key, wherein the initiator public key is registered with a public certificate authority;

a responder long-term secret selected from the key group, and;

a responder public key, in the mathematical group based on the responder long-term secret, wherein the responder public key is registered with public certificate authority;

determining an initiator identity, wherein the initiator identity comprises a binary string based on context information of the initiator;

determining a responder identity, wherein the responder identity comprises a binary string based on context information of the responder;

the initiator generating an initiator ephemeral public key in the mathematical group based on an initiator ephemeral secret key, randomly selected from the key group, and sending the initiator ephemeral public key to the responder;

the responder generating a responder ephemeral public key in the mathematical group based on a responder ephemeral secret randomly selected from the key group, and sending the responder ephemeral public key to the initiator;

computing, a session key for the initiator and a corresponding session key for the responder, by hashing the concatenation of a first computed value, a second computed value, the initiator identity, and the responder identity such that:

by the initiator, for the session key the first value is computed in the mathematical group based on the responder ephemeral public key and the initiator long-term secret key, and the second value is computed in the mathematical group based on the responder public key and the initiator ephemeral secret key;

by the responder, for the corresponding session key the first value is computed in the mathematical group based on the initiator public key and the responder ephemeral secret key, and the second value is computed in the mathematical group based on the initiator ephemeral public key and the responder long-term secret key; and the session key and the corresponding session key, if equal, providing for secure exchange of data between the initiator and the responder.

2. A method as recited in claim 1, wherein the mathematical group is a subgroup of a multiplicative group of natural numbers modulo the first fixed prime number.

3. A method as recited in claim 1, wherein the mathematical group is a subgroup of the group of points on an elliptic curve of prime order.

4. A method as recited in claim 1, wherein operations to compute the session key and the corresponding session key comprise modular exponentiation.

5. A method as recited in claim 1, wherein operations to compute the session key and the corresponding session key comprise scalar multiplication in elliptic curve groups.

6. A method as recited in claim 1, the operations further comprise:

verifying that the initiator ephemeral public key is valid, by raising the public key to the power of the second fixed prime number, and determining that result is the identity element of the group 1 modulo the first prime number.

7. A method as recited in claim 1, wherein computing the session key further comprises computing the session key based on a session identifier, and wherein the session identifier is for use by the responder to determine the corresponding session key.

8. A computer-implemented method for extended authenticated key exchange using a mathematical group via operations comprising:

registering, by an initiator computing device, an initiator identity ($ID_A$) with a certificate authority wherein $ID_A$ comprises a binary string based on context information providing identification indicia of the initiator;

registering, by a responder computing device, an identity ($ID_B$) of the responder with the certificate authority, wherein $ID_B$ comprises a binary string based on context information providing identification indicia of the responder;

computing, by the initiator computing device and the responder computing device, a respective session key based on hashing a concatenation of at least a first value in the mathematical group, a second value in the mathematical group, $ID_A$ and $ID_B$, wherein:

by the initiator, the first value is determined based upon an ephemeral public key of the responder and a long-term secret key of the initiator, and the second value, is determined based upon a public key of the responder and an ephemeral secret key x of the initiator; and by the responder, the first value is determined based upon an initiator public key and a responder ephemeral secret key, and the second value is determined based upon an initiator ephemeral public key, and a responder long-term secret key; and wherein the respective session keys, if equal, provide for secure exchange of data between the initiator computing device and the responder computing device.

9. A method as recited in claim 8, wherein the mathematical group is a subgroup of a multiplicative group of natural numbers modulo a prime number.

10. A method as recited in claim 8, wherein the mathematical group is a subgroup of the group of points on an elliptic curve.

11. A method as recited in claim 8, wherein operations to compute the respective session keys comprise modular exponentiation.

12. A method as recited in claim 8, wherein operations to compute the respective session keys comprise scalar multiplication in an elliptic curve group.

13. A method as recited in claim 8, wherein computing the respective session keys further comprises computing the respective session key based on a session identifier.

14. A computing device for extended authenticated key exchange using a mathematical group, the computing device comprising:

communication means for communicating between an initiator and a responder;

generating means for generating setup parameters, the setup parameters comprising:

a first fixed prime number;

a second fixed prime number that is a divisor of the first prime number minus 1;

an initiator identity or a responder identity, wherein the respective identities are arbitrary binary strings based on context information of the respective initiator and responder;

an initiator long-term secret key or a responder long-term secret key, wherein the respective long-term secret keys are selected from the group 1 to the second fixed prime number minus 1, an initiator public key in the mathematical group based on an initiator long-term secret key, or a responder public key in the mathematical group based on the responder long-term secret key;

an initiator ephemeral secret key or a responder ephemeral secret key, wherein the respective ephemeral secret keys are randomly selected from the group 1 to the second fixed prime number minus 1;

determining means for determining an initiator identity and a responder identity, wherein the initiator identity and the responder identity comprise a binary string based on context information of the respective initiator and responder;

generating means for generating an initiator ephemeral public key in the mathematical group based on the initiator ephemeral secret key and for generating a responder ephemeral public key in the mathematical group based on the responder ephemeral secret key;

sending means for sending the initiator ephemeral public key to the responder and the responder ephemeral public key to the initiator;

validating means for confirming the initiator ephemeral public key or the responder ephemeral public key is valid and terminating extended authenticated key exchange if either the initiator ephemeral public key or the responder ephemeral public key is invalid;

computing means for computing: a session key or a corresponding session key based on hashing the concatenation of at least a first value in the mathematical group, a second value in the mathematical group, the initiator identity, and the responder identity wherein:

for the initiator the first value is determined based upon the responder's ephemeral public key and the initiator's long-term secret key, and the second value, is determined based upon the responder public key and the initiator ephemeral secret key; and for the responder, the first value, is determined based upon the initiator public key and the responder ephemeral secret key, and the second value, is determined based upon the ephemeral public key of the initiator, and the long-term secret key of the responder; and determining means to determine whether the session key and the corresponding session key are equal providing for secure exchange of data between the initiator and the responder.

15. A computing device as recited in claim 14, wherein the mathematical group is a subgroup of a multiplicative group of natural numbers modulo a prime number.

16. A computing device as recited in claim 14, wherein the mathematical group is a subgroup of the group of points on an elliptic curve.

17. A computing device as recited in claim 14, wherein means to compute the session key and the corresponding session key comprise modular exponentiation.

18. A computing device as recited in claim 14, wherein means to compute the session key and the corresponding session key comprise scalar multiplication in elliptic curve groups.

19. A computing device as recited in claim 14, wherein the computing means to compute the session key further comprises computing means to compute the session key based on a session identifier, and wherein the session identifier is for use by the responder to determine the corresponding session key.

20. A computer-implemented method for extended authenticated key exchange between an initiator and a responder using a mathematical group, via operations comprising:

generating, via a computing device, setup parameters, the setup parameters comprising:

p, a fixed prime number;

q, a fixed prime number that is a divisor of p−1;

g, an element from 1 . . . p−1, which has order q;

a, an initiator long-term secret key selected from the group 1 . . . q−1;

A, a registered public key of the initiator, wherein $A=g^a$;

b, a responder long-term secret selected from the group 1 . . . q−1; and

B, a registered public key of the responder, wherein $B=g^b$;

determining, via the computing device, an initiator identity ($ID_A$) and an responder identity ($ID_B$), wherein $ID_A$ comprises a binary string based on context information of the initiator, and $ID_B$ comprises a binary string based on context information of the responder;

the initiator generating, via the computing device, an initiator ephemeral public key X in the mathematical group based on an initiator ephemeral secret key x, randomly selected from 1 . . . p−1, wherein $X=g^x$ mod p, and sending the initiator ephemeral public key X to the responder;

the responder generating, via the computing device, a responder ephemeral public key Y in the mathematical group based on a responder ephemeral secret y, randomly selected from the multiplicative group [1 . . . q−1], wherein $Y=g^y$ mod p, and sending the responder ephemeral public key Y to the initiator;

computing, via the computing device, a session key and a corresponding session key, based at least on a first value $Z_1$, a second value $Z_2$, $ID_A$ and $ID_B$, by hashing the concatenation of $Z_1$, $Z_2$, $ID_A$ and $ID_B$, such that:

by the initiator, for the session key, the first value $Z_1$ is computed from the responder ephemeral public key Y and the initiator's long-term secret key a;

wherein $Z_1=Y^a$ mod p, and the second value $Z_2$ is computed from the responder's public key B and the initiator ephemeral secret key x; wherein $Z_2=B^x$ mod p; and by the responder, for the corresponding session key, the first value $Z_1$ is computed from the initiator public key and the responder ephemeral secret key y, wherein $Z_1=A^y$ mod p, and the second value $Z_2$ is computed from the initiator ephemeral public key X and the responder long-term secret key b, wherein $Z_2=X^b$ mod p; and via the computing device, the session key and the corresponding session key, if equal, providing for secure exchange of data between the initiator and the responder.

* * * * *